(12) United States Patent
Noh et al.

(10) Patent No.: US 7,226,703 B2
(45) Date of Patent: Jun. 5, 2007

(54) ELECTROLYTE FOR RECHARGEABLE LITHIUM BATTERY AND RECHARGEABLE LITHIUM BATTERY COMPRISING SAME

(75) Inventors: Hyung-Gon Noh, Suwon (KR); Eui-Hwan Song, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 378 days.

(21) Appl. No.: 10/834,818

(22) Filed: Apr. 28, 2004

(65) Prior Publication Data

US 2004/0214092 A1 Oct. 28, 2004

(30) Foreign Application Priority Data

Apr. 28, 2003 (KR) ............... 10-2003-0026845

(51) Int. Cl.
   *H01M 10/40* (2006.01)
(52) U.S. Cl. .............. 429/328; 429/336; 429/339; 429/231.8; 429/330
(58) Field of Classification Search ........ 429/328, 429/336, 339, 330
   See application file for complete search history.

(56) References Cited

U.S. PATENT DOCUMENTS 5,626,981 A    5/1997  Simon et al.
6,833,219 B2 * 12/2004  Lee et al. ............. 429/304

FOREIGN PATENT DOCUMENTS

| JP | 06-333596 | 12/1994 |
| JP | 94-333596 | 12/1994 |
| JP | 08-064238 | 3/1996 |
| JP | 96-64238 | 3/1996 |
| JP | 08-321312 | 12/1996 |
| JP | 96-321312 | 12/1996 |
| JP | 09/073918 | 3/1997 |
| JP | 97-73918 | 3/1997 |
| JP | 11-067265 | 3/1999 |
| JP | 11067265 A * | 3/1999 |
| JP | 2002-15769 | 1/2002 |

OTHER PUBLICATIONS

Patent Abstract of Japan 2002-015769, Published Jan. 18, 2002, in the name of Minoru.
Megahed, et al., "Lithium-ion rechargeable batteries" Journal of Power Sources, 51 (1994) 79-104.
Yang, et al., Composition analysis of the passive film on the carbon electrode of a lithium-ion battery with an EC-based electrolyte Journal of Power Sources, 72 (1998) 66-70.
Patent Abstracts of Japan for Publication No. 06-333596, Publication Date Dec. 2, 1994.
Patent Abstracts of Japan for Publication No. 08-064238, Publication Date Mar. 8, 1996.
Patent Abstracts of Japan for Publication No. 08-321312, Publication Date Dec. 3, 1996.
Patent Abstracts of Japan for Publication No. 09-073918, Publication Date Mar. 18, 1997.

* cited by examiner

*Primary Examiner*—Dah-Wei Yuan
*Assistant Examiner*—Karie O'Neill
(74) *Attorney, Agent, or Firm*—Christie, Parker & Hale, LLP

(57) ABSTRACT

Disclosed is an electrolyte for a rechargeable lithium battery including a non-aqueous organic solvent, a lithium salt, and a lactam-based compound selected from the group consisting of compounds represented by formulas 1 to 6:

(1)

-continued
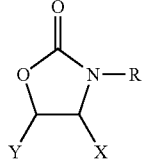
(2)
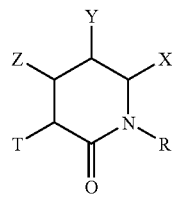
(3)
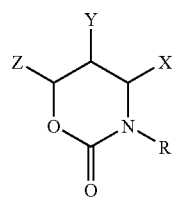
(4)
-continued
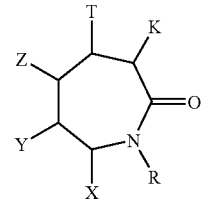
(5)
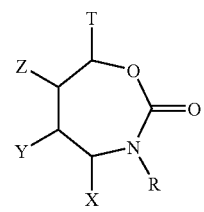
(6)
where R is a H radical, a $C_2$ to $C_6$ alkenyl or a halogen radical; and K, T, X, Y and Z are identically or independently H radicals or halogen radicals.
11 Claims, 2 Drawing Sheets

ELECTROLYTE FOR RECHARGEABLE LITHIUM BATTERY AND RECHARGEABLE LITHIUM BATTERY COMPRISING SAME

CROSS REFERENCE TO RELATED APPLICATION

This application claims priority of application No. 2003-0026845 filed in the Korean Intellectual Property Office on Apr. 28, 2003, the entire disclosure of which is incorporated hereinto by reference.

FIELD OF THE INVENTION

The present invention relates to an electrolyte for a rechargeable lithium battery and a rechargeable lithium battery, and more particularly, to an electrolyte for a rechargeable lithium battery exhibiting high capacity and good cycle life characteristics and that can suppress swelling of batteries, and a rechargeable lithium battery comprising the same.

BACKGROUND OF THE INVENTION

Recently, the rapid development of smaller, lighter, and higher performance communication and other electronic equipment has required the development of high performance and large capacity batteries to power such equipment. The demands for large capacity batteries have fostered investigation of rechargeable lithium batteries. Positive active materials for rechargeable lithium batteries use lithium-transition metal oxides and negative active materials use crystalline or amorphous carbonaceous materials or carbon composites. The active materials are coated on a current collector with a predetermined thickness and length, or they are formed as a film to produce electrodes. The electrodes together with a separator are wound to produce an electrode element and the electrode element is inserted into a battery case such as a can followed by insertion of an electrolyte to fabricate a battery.

The rechargeable lithium battery theoretically exhibits an average discharge voltage of about 3.6 to 3.7V, which is higher than other alkaline batteries such as a Ni-MH (M is a hydrogen storage metal) battery or a Ni—Cd battery. However, such a high discharge voltage can be obtained only from an electrolyte which is electrochemically stable at charge and discharge voltage, 0 to 4.2V. The electrochemically stable electrolyte includes non-aqueous mixed carbonates such as ethylene carbonate or dimethyl carbonate.

During initial charging, lithium ions from a lithium-transition metal oxide positive electrode transfer to a carbonaceous negative electrode to cause the intercalation of lithium ions to the carbonaceous negative electrode. At this time, highly reactive lithium reacts with the carbonaceous negative electrode to generate $Li_2CO_3$, LiO, or LiOH, thereby forming a thin film on a surface of the negative electrode. Such a thin film is called a solid electrolyte interface (SEI) film. The SEI film not only prevents side reactions between lithium ions and a carbonaceous negative electrode or other material during charging and discharging, but also acts as an ion tunnel, allowing the passage of only lithium ions. The ion tunnel prevents the disintegration of the structure of the carbonaceous negative electrode because organic solvents in an electrolyte with a high molecular weight solvate lithium ions, and the solvent and the solvated lithium ions are co-intercalated into the carbonaceous negative electrode. Once the SEI film is formed, side reactions are inhibited, maintaining the amount of lithium ions. That is, the carbonaceous negative electrode reacts with an electrolyte during the initial charging to form a passivation layer such as an SEI film on the surface of the negative electrode, thereby preventing the decomposition of the electrolyte and allowing stable charging and discharging (J. Power Sources, 51(1994), 79–104). According to the mechanism, an irreversible formation reaction of the passivation layer occurs during the initial charging and discharging and does not occur thereafter, thereby providing a battery with stable cycle life characteristics.

However, thin prismatic batteries are problematic in that the carbonate-based organic solvent of the electrolyte can decompose to generate gases in the battery (J. Power Sources, 72(1998), 66–70). These gases include $H_2$, CO, $CO_2$, $CH_4$, $CH_2$, $C_2H_6$, $C_3H_8$, $C_3H_6$, etc. depending on the type of non-aqueous organic solvent and negative active material used. Such generated gas causes expansion of the volume of the battery and an increase in electrochemical energy and heat energy when the battery is stored at high temperatures, thereby slowly disintegrating the passivation layer which results in a side reaction between an exposed surface of the negative electrode. In addition, the generation of gas causes an increase in internal pressure, which induces the deformation of prismatic batteries and lithium polymer batteries, thereby deteriorating battery performance and stability.

One attempt to solve these problems has been to add an additive to an electrolyte. As the additive, carbonate-based compounds are disclosed in U.S. Pat. No. 5,626,981 and Japanese Laid-Open Patent No. 2002-15769. However, there are various problems with these methods: the added compound is decomposed or forms an unstable film by interacting with the carbon negative electrode during initial charging and discharging according to inherent electrochemical characteristics, resulting in the deterioration of the ion mobility in an electrode; and gas is generated inside the battery such that there is an increase in internal pressure, resulting in the significant worsening of the storage characteristics, stability, cycle life, and capacity of the battery.

Toshiba has attempted to use γ-butyrolactone in pouch-type batteries in order to suppress swelling (expansion of the battery), but it has not been effective.

SUMMARY OF THE INVENTION

In one embodiment of the present invention, an electrolyte for a rechargeable lithium battery is provided which is useful in prismatic or pouch-type batteries and is capable of suppressing swelling of the batteries without decreasing their capacity and cycle life characteristics.

In another embodiment of the present invention, a rechargeable lithium battery including the electrolyte is provided.

In still another embodiment of the invention, an electrolyte for a rechargeable lithium battery is provided including a lithium salt, a non-aqueous organic solvent; and a lactam-based compound selected from the group consisting of compounds represented by formulas 1 to 6:

(1)
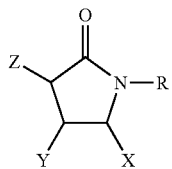

(2)
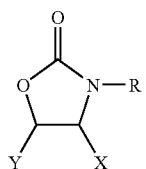

(3)
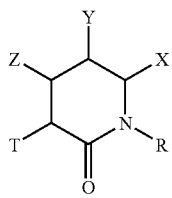

(4)
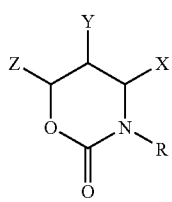

(5)
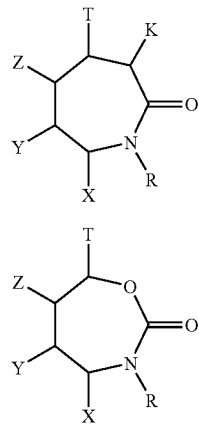

(6)

where R is a hydrogen radical, a $C_2$ to $C_6$ alkenyl or a halogen radical; and K, T, X, Y, and Z are identically or independently hydrogen radicals or halogen radicals.

In order to achieve these aspects and others, the present invention provides a rechargeable lithium battery including the electrolyte, a positive electrode, and a negative electrode. The positive electrode and the negative electrode respectively include active materials which are capable of intercalating and deintercalating lithium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
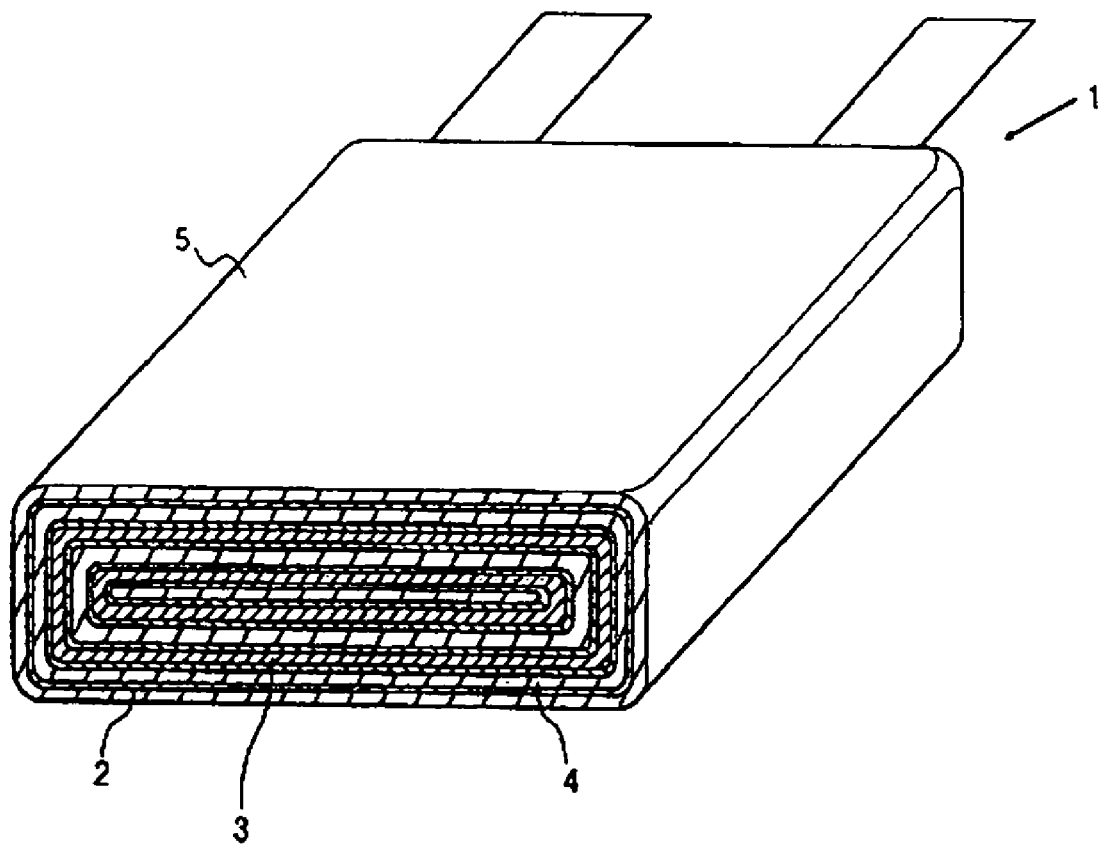
FIG. 1 is an illustration of a battery according to the present invention.

The present invention relates to an electrolyte for a rechargeable lithium battery exhibiting good capacity and cycle life characteristics, and that suppresses swelling of the battery at high temperatures.

The electrolyte of the present invention includes a lactam-based compound in addition to a conventional electrolyte including a non-aqueous organic solvent and a lithium salt. The lactam-based compound is represented by formulas 1 to 6:

(1)
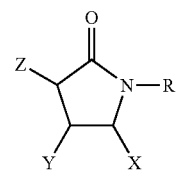

(2)
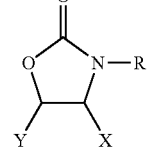

(3)
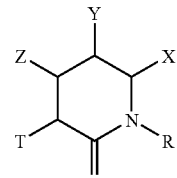

(4)
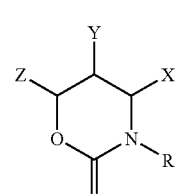

(5)
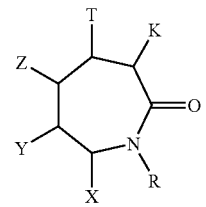

-continued

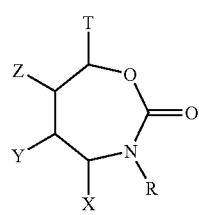

(6)

where R is a hydrogen radical, a $C_2$ to $C_6$ alkenyl, preferably vinyl, or a halogen radical; and K, T, X, Y, and Z are identically or independently hydrogen radicals or halogen radicals.

The examples of the lactam-based compound may be N-vinylcaprolactam, N-bromocaprolactam, delta-valerocaprolactam, N-methyl-gamma-caprolactam, vinylbutyrolactam, caprolactam, or gamma-butyrolactam.

The lactam-based compound is preferably provided in an amount between 0.01 and 10 wt % based on the weight of the non-aqueous organic solvent and more preferably, between 1 and 8 wt %. If the amount of the lactam-based compound is less than 0.01 wt %, the effect of the addition of the lactam-based compound cannot be obtained. If that of the lactam-based compound is more than 10 wt %, the cycle life characteristic deteriorates.

The non-aqueous organic solvent includes at least one cyclic carbonate, linear carbonate, ester, or ketone. If a mixture thereof is used, the mixing ratio can be suitably controlled according to the desired battery performance, as is well understood in the related art. Suitable cyclic carbonates include ethylene carbonate, propylene carbonate, and mixtures thereof. Linear carbonates include dimethyl carbonate, diethyl carbonate, ethylmethyl carbonate, and methyl propyl carbonate. Esters include γ-butyrolactone, valerolactone, decanolide, and mevalolactone. A suitable ketone is polymethylvinyl ketone.

The non-aqueous organic solvent may further be a halogenated benzene in order to improve low-temperature, cycle life, and high-temperature characteristics. A halogenated benzene is represented by formula 7:

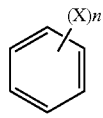

(7)

where X is a radical of F, Cl, Br or I, and n is an integer from 1 to 3.

The preferred amount of the halogenated benzene is 5 to 40 parts by volume based on 100 parts by volume of the total electrolyte. If the amount of the halogenated benzene is less than 5 parts by volume, ionic conductivity at low temperatures decreases. If that of the halogenated benzene is more than 40 parts by volume, ionic conductivity at room temperatures decreases.

The electrolyte includes a lithium salt as a supporting electrolytic salt. Suitable lithium salts include lithium hexafluorophosphate ($LiPF_6$), lithium tetrafluoroborate ($LiBF_4$), lithium perchlorate ($LiClO_4$), lithium trifluoromethanesulfonate ($CF_3SO_3Li$), and lithium hexafluoroarsenate ($LiAsF_6$). The lithium salt acts as a source for supplying lithium ions in the battery, and helps the working of the battery. In addition, the lithium salt activates transfer of lithium ions between a positive electrode and a negative electrode.

A rechargeable lithium battery with the inventive electrolyte includes a positive electrode and a negative electrode.

An embodiment of the rechargeable lithium battery 1 of the present invention is shown in FIG. 1. The rechargeable lithium battery 1 in FIG. 1 includes a positive electrode 3, a negative electrode 4, and an electrolyte 2. The positive electrode 3, the negative electrode 4, and the electrolyte 2 are received in a battery case 5.

The positive electrode includes a positive active material in which lithium intercalation reversibly occurs. Examples of the positive active material are lithium transition metal oxides such as $LiCoO_2$, $LiNiO_2$, $LiMnO_2$, $LiMn_2O_4$, or $LiNi_{1-x-y}CO_xM_yO_2$ where $0 \leqq x \leqq 1$, $0 \leqq y \leqq 1$, $0 \leqq x+y \leqq 1$, and M is a metal such as Al, Sr, Mg, or La.

The negative electrode includes a negative active material in which lithium intercalation reversibly occurs. Examples of negative active materials include crystalline or amorphous carbonaceous materials, or carbon composites.

The positive active material and the negative active material are respectively coated on current collectors to produce electrodes, and the electrodes are wound together with or laminated on a separator to produce an electrode element. The electrode element is inserted into a battery case such as a can, and an electrolyte is injected into the case to fabricate a rechargeable lithium battery. The separator may be a resin such as polyethylene or polypropylene.

The following Examples further illustrate the present invention in detail, but are not to be construed to limit the scope thereof.

EXAMPLE 1

94 wt % of a $LiCoO_2$ positive active material, 3 wt % of a Super-P conductive material, and 3 wt % of a polyvinylidene fluoride binder were mixed in a N-methyl pyrrolidone solvent to prepare a positive active material slurry. The positive active material slurry was coated on a Al-foil current collector and dried to produce a positive electrode with a width of 4.9 cm and a thickness of 147 μm.

89.9 wt % of an artificial graphite material (PHS, available from Japan Carbon Ltd.), 0.2 wt % of an oxalic acid additive, and 10 wt % of polyvinylidene fluoride binder were mixed in a N-methyl pyrrolidone solvent to prepare a negative active material slurry. The negative active material slurry was coated on a Cu-foil current collector and dried to produce a negative electrode with a width of 5.1 cm and a thickness of 178 μm.

Using the positive electrode, the negative electrode, a polyethylene film separator (Asahi, Co. Ltd., width: 5.35 cm, thickness: 18 μm), and an electrolyte, a rechargeable lithium cell with a nominal capacity of 640 mAh was fabricated.

The electrolyte was produced by dissolving 1.15M $LiPF_6$ in a mixed solvent of ethylene carbonate, ethyl methyl carbonate, propylene carbonate, and fluorobenzene at a volume ratio of 30:55:10:5, and adding N-vinylcaprolactam represented by formula 5a thereto. At this time, the amount of N-vinylcaprolactam was 1 wt % of the weight of the mixed solvent.

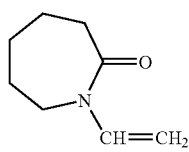

(5a)

EXAMPLE 2

A rechargeable lithium cell was fabricated by the same procedure as in Example 1, except that the amount of N-vinylcaprolactam represented by formula 5a was 2 wt % of the weight of the mixed solvent.

EXAMPLE 3

A rechargeable lithium cell was fabricated by the same procedure as in Example 1, except that the amount of N-vinylcaprolactam represented by formula 5a was 3 wt % of the weight of the mixed solvent.

COMPARATIVE EXAMPLE 1

A rechargeable lithium cell was fabricated by the same procedure as in Example 1, except that the N-vinylcaprolactam represented by formula 5a was not used.

The rechargeable lithium cells according to Examples 1 to 3, and Comparative Example 1 were charged and discharged at 0.1C, 0.5C, 1C and 2C. The internal resistance, standard charge capacity, standard discharge capacity, and standard efficiency were measured. In addition, discharge capacities at various C-rates, i.e. 0.5C, 1C, and 2C, and capacity retention were measured. The results are presented in Table 1. The internal resistance was obtained from full-charging at 4.2V after formation. The standard charge capacity and the standard discharge capacity were obtained by charging at 0.5C and discharging at 0.2C after formation. The standard efficiency was a percentage value obtained from the standard discharge capacity to the standard discharge capacity. The discharge capacities at various C-rates, were obtained from discharging for 2 hours (0.5C), 1 hour (1C), and 30 minutes (2C), respectively. As the C-rate increases, the discharge capacity decreases. The capacity retention was a percentage value obtained from the measured discharge capacity to the standard discharge capacity.

As shown in Table 1, the cells according to Examples 1 to 3 exhibited charge and discharge capacities corresponding to or similar with that according to Comparative Example 1.

The rechargeable lithium cells according to Examples 1 to 3 and Comparative Example 1 were allowed to stand at 90° C. for 4 hours. From the initial thickness of the cells and the final thickness after 4 hours, the swelling properties (increases in the thickness) were measured. The results are presented in Table 2.

TABLE 2

|  | Initial thickness (μm) | Final thickness (μm) | Increases in the thickness (%) |
|---|---|---|---|
| Comparative Example 1 | 4.15 | 5.27 | 27 |
| Example 1 | 4.15 | 5.02 | 21 |
| Example 2 | 4.15 | 4.77 | 15 |
| Example 3 | 4.15 | 4.60 | 11 |

It is evident from Table 2 that the increases in thickness of the cells according to Examples 1 to 3 were reduced compared to those of the cells of Comparative Example 1. These results indicate that swelling was suppressed in the cells according to Examples 1 to 3 compared with Comparative Example 1.

The cycle life characteristics according to Examples 1 to 3 and Comparative Example 1 were measured by constant-current charging and constant-current discharging at 0.5C to 4.2V (25° C.) and a cut-off of 20 mA, and discharging at a cut-off of 2.75V, while the C-rates were changed from 0.2C, 0.5C, 1C, and 2C. The results are presented in FIG. 2. The results from FIG. 2 indicate that the cells according to Examples 1 to 3 exhibit good cycle life characteristics while the cycles were repeated compared to that of Comparative Example 1.

Figure 2:
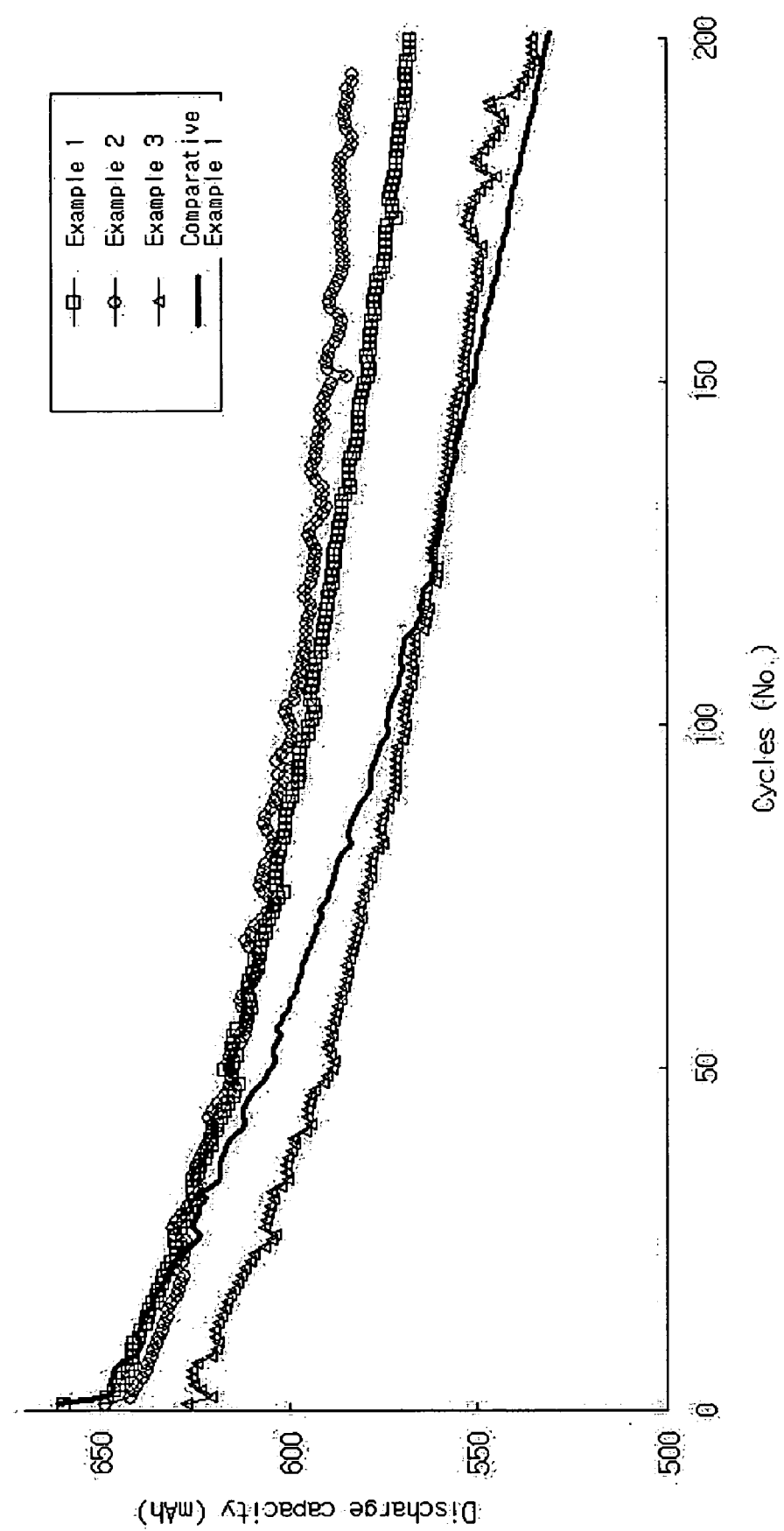
FIG. 2 is a graph illustrating the cycle life characteristics of cells using electrolytes according to Examples 1 to 3 of the present invention.

It is evident from Tables 1 and 2, and FIG. 2 that the cell with electrolyte of the present invention can effectively suppress the swelling without deterioration of the battery performances such as in capacity and cycle life characteristics.

While the present invention has been described in detail with reference to the preferred embodiments, those skilled in the art will appreciate that various modifications and sub-

TABLE 1

|  | | Standard | | | 0.5C | | 1C | | 2C | |
|---|---|---|---|---|---|---|---|---|---|---|
|  | IR2 (mΩ) | Charge (mAh/g) | Discharge (mAh/g) | Efficiency (%) | Discharge (mAh/g) | Capacity retention (%) | Discharge (mAh/g) | Capacity retention (%) | Discharge (mAh/g) | Capacity retention (%) |
| Comparative Example 1 | 42.30 | 646 | 638 | 99 | 633 | 99 | 628 | 98 | 613 | 96 |
|  | 42.83 | 648 | 640 | 99 | 623 | 97 | 629 | 98 | 612 | 96 |
|  | 42.60 | 649 | 641 | 99 | 636 | 99 | 631 | 98 | 614 | 96 |
|  | 42.58 | 648 | 639 | 99 | 631 | 99 | 629 | 98 | 613 | 96 |
| Example 1 | 43.10 | 645 | 639 | 99 | 632 | 99 | 627 | 98 | 614 | 96 |
|  | 42.90 | 642 | 641 | 100 | 628 | 98 | 625 | 98 | 612 | 95 |
|  | 42.90 | 647 | 641 | 99 | 633 | 99 | 631 | 98 | 611 | 95 |
|  | 42.97 | 645 | 640 | 99 | 631 | 99 | 628 | 98 | 612 | 96 |
| Example 2 | 43.11 | 643 | 637 | 99 | 628 | 99 | 621 | 97 | 609 | 96 |
|  | 42.87 | 645 | 635 | 98 | 623 | 98 | 617 | 97 | 603 | 95 |
|  | 42.76 | 639 | 631 | 99 | 621 | 98 | 611 | 97 | 604 | 96 |
|  | 42.91 | 642 | 634 | 99 | 624 | 98 | 616 | 97 | 605 | 95 |
| Example 3 | 42.43 | 641 | 628 | 98 | 621 | 99 | 609 | 97 | 593 | 94 |
|  | 42.31 | 639 | 631 | 99 | 618 | 98 | 613 | 97 | 597 | 95 |
|  | 42.21 | 635 | 631 | 99 | 621 | 98 | 612 | 97 | 594 | 94 |
|  | 42.32 | 638 | 630 | 99 | 620 | 98 | 611 | 97 | 595 | 94 |

What is claimed is:

1. An electrolyte for a rechargeable lithium battery comprising:
a lactam-based compound selected from the group consisting of compounds represented by formulas 1 to 6;

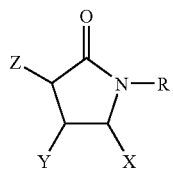
(1)

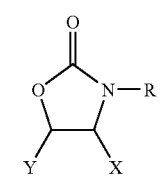
(2)

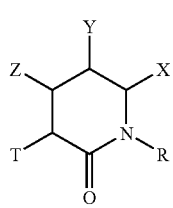
(3)

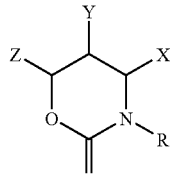
(4)

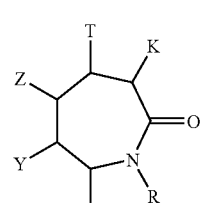
(5)

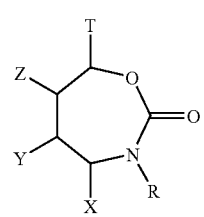
(6)

where R is selected from the group consisting of $C_2$ to $C_6$ alkenyls and halogen radicals; and each of K, T, X, Y and Z is independently selected from the group consisting of halogen radicals;
a non-aqueous organic solvent; and
a lithium salt.

2. The electrolyte of claim 1, wherein the amount of the lactam-based compound is 0.01 to 10 wt % based on the weight of the non-aqueous organic solvent.

3. The electrolyte of claim 1, wherein the non-aqueous organic solvent is selected from the group consisting of cyclic carbonates, linear carbonates, esters, ethers, ketones and combinations thereof.

4. The electrolyte of claim 3, wherein the non-aqueous organic solvent further comprises a halogenated benzene represented by formula 7:

(7)

where X is a radical selected from the group consisting of F, Cl, Br and I, and n is an integer from 1 to 3.

5. The electrolyte of claim 1, wherein the lithium salt is selected from the group consisting of lithium hexafluorophosphate, lithium tetrafluoroborate, lithium perchlorate, lithium trifluoromethanesulfonate, lithium hexafluoroarsenate, and combinations thereof.

6. A rechargeable lithium battery comprising:
an electrolyte for a rechargeable lithium battery comprising a non-aqueous organic solvent; a lithium salt; and a lactam-based compound selected from the group consisting of compounds represented by formulas 1 to 6;

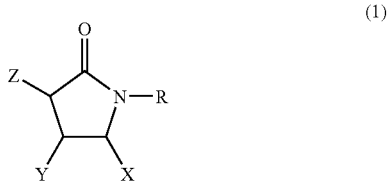
(1)

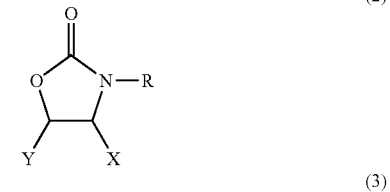
(2)

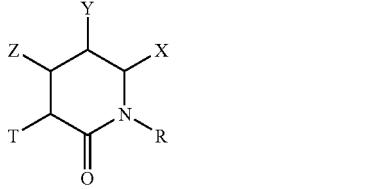
(3)

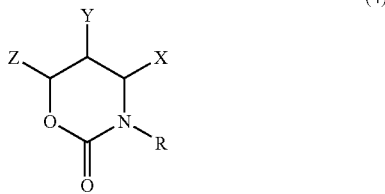
(4)

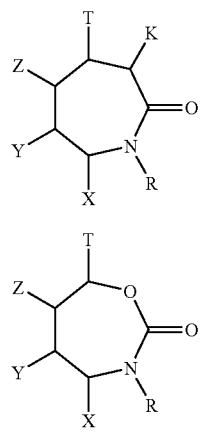

(5)

(6)

where R is selected from the group consisting of $C_2$ to $C_6$ alkenyls and halogen radicals; and each of K, T, X, Y, and Z is independently selected from the group consisting of halogen radicals;

a positive electrode comprising a positive active material which is capable of intercalating and deintercalating lithium; and a negative electrode comprising a negative active material which is capable of intercalating and deintercalating lithium.

7. The rechargeable lithium battery of claim 6, wherein the amount of the lactam-based compound is 0.01 to 10 wt % based on the weight of the non-aqueous organic solvent.

8. The rechargeable lithium battery of claim 6, wherein the negative active material is selected from the group consisting of crystalline carbon, amorphous carbon, and carbon composites.

9. The rechargeable lithium battery of claim 6, wherein the non-aqueous organic solvent is selected from the group consisting of cyclic carbonates, linear carbonates, esters, ethers, ketones and combinations thereof.

10. The rechargeable lithium battery of claim 9, wherein the non-aqueous organic solvent further comprises a halogenated benzene represented by formula 7:

(7)

where X is a radical selected from the group consisting of F, Cl, Br and I, and n is an integer from 1 to 3.

11. The rechargeable lithium battery of claim 6, wherein the lithium salt is selected from the group consisting of lithium hexafluorophosphate, lithium tetrafluoroborate, lithium perchlorate, lithium trifluoromethanesulfonate, lithium hexafluoroarsenate, and combinations thereof.

* * * * *